US011188270B2

(12) United States Patent
Borlick et al.

(10) Patent No.: US 11,188,270 B2
(45) Date of Patent: Nov. 30, 2021

(54) TARGETED SECURE DATA OVERWRITE

(71) Applicant: INTERNATIONAL BUSINESS MACHINES CORPORATION, Armonk, NY (US)

(72) Inventors: Matthew G. Borlick, Tucson, AZ (US); Kurt A. Lovrien, Tucson, AZ (US); Karl A. Nielsen, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 453 days.

(21) Appl. No.: 15/164,834

(22) Filed: May 25, 2016

(65) Prior Publication Data
US 2017/0344280 A1 Nov. 30, 2017

(51) Int. Cl.
G06F 3/06 (2006.01)
G06F 21/78 (2013.01)

(52) U.S. Cl.
CPC ............ *G06F 3/067* (2013.01); *G06F 3/0623* (2013.01); *G06F 3/0652* (2013.01); *G06F 2221/2143* (2013.01)

(58) Field of Classification Search
CPC ...... G06F 3/0619; G06F 3/065; G06F 3/0659; G06F 3/0665; G06F 3/067; G06F 2212/1052; G06F 3/0652; G06F 21/606
See application file for complete search history.

(56) References Cited

U.S. PATENT DOCUMENTS

| | | | |
|---|---|---|---|
| 5,734,894 A * | 3/1998 | Adamson | G06F 11/1435 |
| 7,631,161 B2 | 12/2009 | Haustein et al. | |
| 7,685,389 B2 | 3/2010 | Haustein et al. | |
| 7,694,096 B2 | 4/2010 | Haustein et al. | |
| 7,707,371 B1 * | 4/2010 | Goheer | G06F 3/0623 |
| | | | 360/118 |
| 7,831,560 B1 | 11/2010 | Spertus et al. | |
| 8,667,497 B2 | 3/2014 | Ripberger | |
| 10,146,782 B1 * | 12/2018 | Bono | G06F 16/11 |
| 2006/0242372 A1 * | 10/2006 | Furuhashi | G06F 11/2082 |
| | | | 711/162 |
| 2007/0094468 A1 | 4/2007 | Haustein et al. | |
| 2007/0094469 A1 | 4/2007 | Haustein et al. | |

(Continued)

*Primary Examiner* — Andrew J Cheong
(74) *Attorney, Agent, or Firm* — Konrad Raynes Davda & Victor LLP; William K. Konrad

(57) ABSTRACT

Provided are a computer program product, system, and method in accordance with one embodiment of the present description, in which selected memory resources targeted for secure data cleaning. For example, memory resources which may be targeted for secure data cleaning may include a specific volume (or portion of a volume) of data storage which has been selected for secure erasure of any residual data which may remain on the targeted storage volume before the volume is released for use by others. Other examples of memory resources which may be targeted for secure data cleaning in accordance with the present description may include one or more buffers located in switches or other storage area network components which provide data paths between hosts and storage controllers or storage control units. Other aspects of targeted secure data overwriting in accordance with the present description are described.

22 Claims, 10 Drawing Sheets

(56) References Cited

U.S. PATENT DOCUMENTS

| | | | |
|---|---|---|---|
| 2007/0094470 A1 | 4/2007 | Haustein et al. | |
| 2008/0250270 A1* | 10/2008 | Bennett | G06F 11/1068 714/6.13 |
| 2008/0263271 A1* | 10/2008 | Kishi | G06F 21/62 711/111 |
| 2008/0263274 A1* | 10/2008 | Kishi | G06F 3/0623 711/114 |
| 2009/0132622 A1* | 5/2009 | Rossmann | G06F 12/0261 |
| 2009/0216973 A1* | 8/2009 | Nakajima | G06F 11/1451 711/162 |
| 2012/0084499 A1* | 4/2012 | Iwasaki | G06F 3/0617 711/111 |
| 2012/0237024 A1* | 9/2012 | Liu | H04L 9/0869 380/44 |
| 2012/0239943 A1* | 9/2012 | Okamoto | G06F 21/6218 713/193 |
| 2012/0311253 A1 | 12/2012 | Kishi et al. | |
| 2013/0254507 A1* | 9/2013 | Islam | G06F 21/6218 711/166 |
| 2013/0290482 A1* | 10/2013 | Leggette | H04L 67/1097 709/217 |
| 2014/0130188 A1* | 5/2014 | Baryudin | G06F 21/78 726/29 |
| 2014/0143786 A1 | 5/2014 | Ripberger | |
| 2014/0173226 A1* | 6/2014 | Gold | G06F 17/30117 711/159 |
| 2014/0245072 A1 | 8/2014 | Barajas | |
| 2014/0281211 A1* | 9/2014 | Evans | G06F 3/0647 711/111 |
| 2014/0298479 A1* | 10/2014 | Stass | G06F 21/606 726/26 |
| 2014/0344535 A1* | 11/2014 | Johnson | G06F 12/121 711/159 |
| 2014/0365743 A1* | 12/2014 | Pronozuk | G06F 3/0623 711/166 |
| 2015/0012982 A1* | 1/2015 | Hohnke | H04L 67/1097 726/5 |
| 2015/0106562 A1* | 4/2015 | Helmer | G06F 3/0652 711/114 |
| 2015/0121537 A1* | 4/2015 | Ellis | G06F 21/60 726/26 |
| 2015/0187383 A1 | 7/2015 | Dawson et al. | |
| 2015/0212751 A1* | 7/2015 | Shi | G06F 3/0623 711/103 |
| 2017/0003915 A1* | 1/2017 | Baptist | G06F 3/0659 |
| 2017/0052734 A1* | 2/2017 | Kirchner | G06F 3/0608 |
| 2017/0108902 A1* | 4/2017 | Hedge | G06F 3/0608 |
| 2017/0193232 A1* | 7/2017 | Rabasco | G06F 21/60 |

* cited by examiner

TARGETED SECURE DATA OVERWRITE

BACKGROUND OF THE INVENTION

1. Field of the Invention

The present invention relates to a computer program product, system, and method for data cleaning in a storage area network.

2. Description of the Related Art

Data storage systems frequently store sensitive data. Control over access to a storage system may be temporarily lost or degraded while the storage system is transported from one facility to another. Moreover, such control over access is usually lost entirely upon selling or otherwise disposing of the storage system.

Accordingly, before custody or other access to the storage system is transferred to another party, a data cleaning or data erasure process often referred to as Secure Data Overwrite (SDO) is frequently employed to ensure that any residual data remaining on storage units is destroyed to prevent recovery of any such residual data from the storage units. In a disk storage unit, the SDO erasure process typically repeatedly writes various data patterns over the entire data storage surface of each disk of the disk storage unit, in multiple passes, to obscure any residual data which may have remained on the disks. Thus, an SDO process is frequently initiated to securely erase all the data of every storage disk of the entire storage unit prior to transferring a storage unit previously used to store sensitive data.

SUMMARY

A system of one or more computers can be configured to perform particular operations or actions of targeted secure data overwriting in accordance with the present description, by virtue of having software, firmware, hardware, or a combination of them installed on the system that in operation causes or cause the system to perform the actions. One or more computer programs can be configured to perform particular operations or actions of targeted secure data overwriting in accordance with the present description, by virtue of including instructions that, when executed by data processing apparatus, cause the apparatus to perform the actions.

One general aspect of targeted secure data overwriting in accordance with the present description, includes targeting memory resources for secure data cleaning. Targeted memory resources may include, for example, a specific data storage volume (or portion of a volume) which has been selected for secure erasure of any residual data which may remain on the targeted storage volume before the volume is released for use by others. Known previous secure data overwrite processes were not directed to targeted volumes but instead were initiated to erase all the data of every storage disk of the entire storage unit prior to transferring or otherwise disposing of the storage unit.

Thus, targeted secure data overwriting in accordance with one aspect of the present description may include data cleaning a first memory location of a first volume of data storage to erase residual data stored in the first memory location. In one embodiment, the data cleaning may include determining whether a secure data overwrite target metadata attribute of the first volume of data storage has been set, and in response, performing a multi-pass secure data overwriting of the first memory location. Other embodiments of this aspect include corresponding computer systems, apparatus, methods, and computer programs recorded on one or more computer storage devices, each configured to perform actions as described herein.

Implementations may include one or more of the following features. In one aspect, the data cleaning further includes in response to a determination that the secure data overwrite target metadata attribute of the first volume of data storage has been set, setting a data structure indicating a status of memory locations of the first volume to indicate a status of the first memory location as pending a multi-pass secure data overwriting of the first memory location. In another aspect, the data cleaning further includes determining a status of the first memory location as pending a multi-pass secure data overwriting of the first memory location, and in response to the determination, performing a multi-pass secure data overwriting of the first memory location.

Still another aspect is directed to, in a first transfer operation, transferring data packets between the first volume and a second location, the transferring including determining whether an end-to-end secure data overwrite metadata attribute of the first volume of data storage has been set. In another aspect, in response to a determination that the an end-to-end secure data overwrite metadata attribute of the first volume of data storage has been set, marking the data packets with a secure data overwrite packet flag to indicate a multi-pass secure data overwriting at intermediate memory locations between the first volume and the second location, the intermediate memory locations temporarily storing the data packets in the first transfer operation. In yet another aspect, the transferring data packets further includes: identifying intermediate memory locations between the first volume and the second location, which temporarily stored marked data packets in the first transfer operation, and multi-pass secure data overwriting identified intermediate memory locations between the first volume and the second location, which temporarily stored marked data packets in the first transfer operation.

Still another aspect is directed to determining whether an end-to-end secure data overwrite metadata attribute of the first volume of data storage has been set, and if so, setting a secure data transfer flag for the first transfer operation to indicate a multi-pass secure data overwriting at intermediate memory locations between the first volume and the second location, the intermediate memory locations temporarily storing the data packets in the first transfer operation. In response to a determination that a data transfer flag for the first transfer operation has been set, marking the data packets with a secure data overwrite packet flag to indicate a multi-pass secure data overwriting at intermediate memory locations between the first volume and the second location, the intermediate memory locations temporarily storing the data packets in the first transfer operation.

Implementations of the described techniques may include hardware, a method or process, or computer software on a computer-accessible medium. Other aspects of targeted secure data overwriting in accordance with the present description are described.

DETAILED DESCRIPTION

Figure 1A:
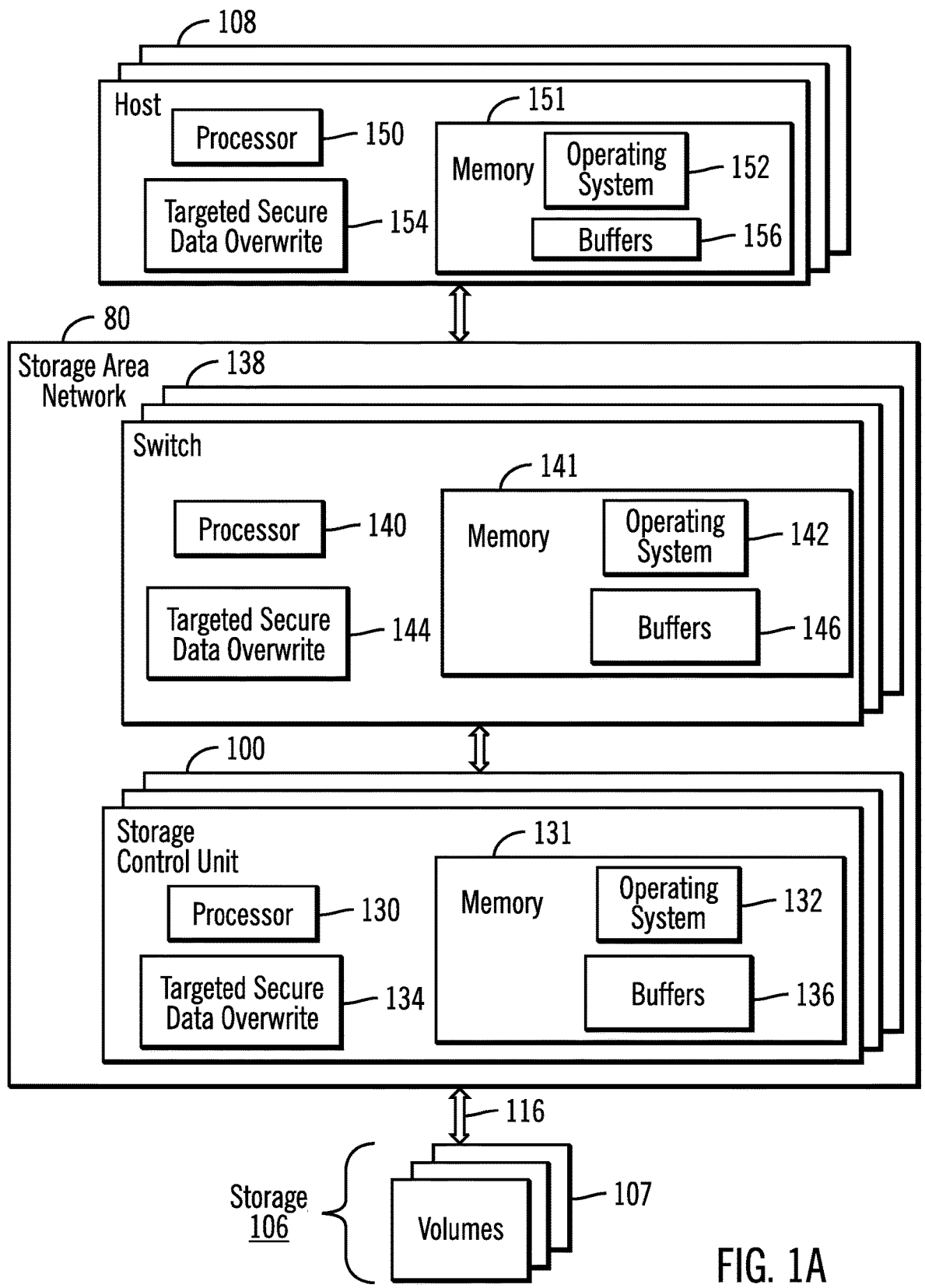
FIG. 1A illustrates an embodiment of a storage environment, employing aspects of targeted secure data overwriting in accordance with the present description.

Described embodiments provide for targeted secure data overwriting to effectively clean selected memory resources targeted for secure data cleaning. For example, memory resources which may be targeted for secure data cleaning in accordance with one aspect of the present description, may include a specific data storage volume (or portion of a volume) which has been selected for secure erasure of any residual data which may remain on the targeted storage volume before the volume is released for use by others. Known previous secure data overwrite processes were not directed to targeted volumes but instead were initiated to erase all the data of every storage disk of the entire storage unit prior to transferring or otherwise disposing of the storage unit.

In one embodiment of the present description, a particular storage volume may be targeted for secure data overwriting by setting an appropriate metadata attribute of the storage volume to indicate that the memory locations assigned to the associated storage volume have been targeted for secure data overwriting before the memory locations are released for use by other parties, processes or volumes. Accordingly, if a storage volume (or a portion of a storage volume), for example, is to be moved, deleted or otherwise released, a determination may be made as to whether a secure data overwrite target metadata attribute has been set for the particular storage volume. If so, and in response to a determination that the secure data overwrite target metadata attribute has been set for that particular volume of data storage, a multi-pass secure data overwriting of the memory locations previously employed by the particular volume (or volume portion) may be performed before the prior memory locations of the storage volume (or volume portion) are released for use by other parties or processes. In this manner, any residual data remaining on the particular volume may be securely erased to prevent unauthorized recovery of the residual data.

As used herein, the term memory locations includes locations for storing data in either a volatile or non-volatile manner in a memory, random access memory (RAM), cache, non-volatile storage (NVS), disk storage, flash, solid state drive (SSD), tape or other data storage media, where the data may be a candidate for targeted data cleaning as described herein.

Other examples of memory resources which may be targeted for secure data cleaning in accordance with the present description may include one or more buffers located in switches or other storage area network components which provide data paths between hosts and storage controllers or storage control units. It is appreciated that as read and write data passes through data paths between a host and storage such as a disk storage, for example, buffers are frequently employed along the various data paths, to temporarily store the data being transferred between the hosts and the storage. Even though these buffers may be used for only a relatively short time, and may be reused again quickly, absent targeted secure data overwriting in accordance with the present description, it is appreciated that the buffers may provide an opportunity for unauthorized access to residual data which may remain on the buffers.

In one embodiment of the present description, a particular data transfer and the buffers employed for the data transfer may be targeted for secure data overwriting by setting an appropriate metadata attribute of the target storage volume to indicate that the memory locations employed for the data transfer to or from the target storage volume have been targeted for end-to-end secure data overwriting. Accordingly, if data is to be transferred to or from a particular storage volume, for example, a determination may be made as to whether an end-to-end secure data overwrite flag metadata attribute of the particular volume of data storage has been set. If so, and in response to a determination that the an end-to-end secure data overwrite flag metadata attribute of the particular volume of data storage has been set, the data packets of the data transfer may be suitably marked with a secure data overwrite packet flag to indicate a multi-pass secure data overwriting is to be performed at intermediate memory locations such as buffers temporarily storing the data packets in connection with the transfer operation.

In one embodiment, intermediate memory locations between a host and the target storage volume of the data transfer operation, which temporarily stored marked data packets, may be identified by a targeted secure clean-up process. For each such intermediate memory location identified as having stored data packets marked with a secure data overwrite packet flag, multi-pass secure data overwriting may be employed to securely erase the identified intermediate memory locations of the data transfer operation.

In another aspect of the present description, a determination may be made as to whether an end-to-end secure data overwrite flag metadata attribute of a target volume of data storage has been set. If so, and in response to a determination that the an end-to-end secure data overwrite flag metadata attribute of the target storage volume has been set, a secure data transfer flag may be set in connection with the data transfer operation to indicate a multi-pass secure data overwriting to be performed at intermediate memory locations between the host and the target storage volume. In response to a determination that a secure data transfer flag has been set for a data transfer operation, the data packets of the data transfer may be suitably marked with a secure data overwrite packet flag to indicate a multi-pass secure data overwriting is to be performed at intermediate memory locations such as buffers temporarily storing the data packets in connection with the transfer operation having the secure data transfer flag. Accordingly, multi-pass secure data overwriting may be performed at identified intermediate memory locations to ensure secure erasing of any residual data at those intermediate memory locations between the host and the target storage volume.

FIG. 1A illustrates an embodiment of a computing environment including a storage area network 80 having one or more storage control units 100, such as a server or storage controller, that manages access to data stored in one or more storage devices such as a storage 106, by one or more hosts as represented by a host 108 (FIG. 1A). Thus, each storage control unit 100 is configured to control read operations from and write operations to a data storage 106. The storage devices of the storage 106 store data in one or more units of storage, referred to as volumes 107 in this embodiment. The storage area network provides data paths for input/output data transfer operations between the storage control units 100 and the hosts 108, and between the storage control units 100, as well.

In one embodiment, each storage control unit 100 may be a primary storage control unit 100a (FIG. 1B) for a primary storage 106a similar to the storage 106 (FIG. 1A), or may be a secondary storage control unit 100b for a secondary storage 106b similar to the storage 106 (FIG. 1A). Data may be stored in data units in the form of storage volumes of the storage devices 106a, 106b (FIG. 1A), which may be in a peer-to-peer mirror relationship such that data written to one storage volume, typically a primary storage volume in the primary storage 106a, is mirrored to a corresponding secondary storage volume in the secondary storage 106b such that the secondary storage volume is a copy of the primary storage volume. The source of the data written to the storage volumes is typically one or more of the hosts 108, or may be another storage control unit 100. Thus, the hosts 108 issue input/output requests over the storage area network 80 to a storage control unit 100 requesting the storage control unit 100 to read data from or write data to the storage volumes of the storage 106 controlled by the storage control unit 100. It is appreciated that targeted secure data overwriting in accordance with the present description is applicable to other data processing environments in addition to storage environments having storage volumes in a mirrored, peer-to-peer relationship.

The storage 106 (FIG. 1A), 106a, 106b (FIG. 1B) may comprise one or more storage devices known in the art, such as a solid state storage device (SSD) comprised of solid state electronics, EEPROM (Electrically Erasable Programmable Read-Only Memory), flash memory, flash disk, Random Access Memory (RAM) drive, storage-class memory (SCM), Phase Change Memory (PCM), resistive random access memory (RRAM), spin transfer torque memory (STM-RAM), conductive bridging RAM (CBRAM), magnetic hard disk drive, optical disk, tape, etc. The storage devices may further be configured into an array of devices, such as Just a Bunch of Disks (JBOD), Direct Access Storage Device (DASD), Redundant Array of Independent Disks (RAID) array, virtualization device, etc. Further, the storage devices may comprise heterogeneous storage devices from different vendors or from the same vendor.

Figure 1B:
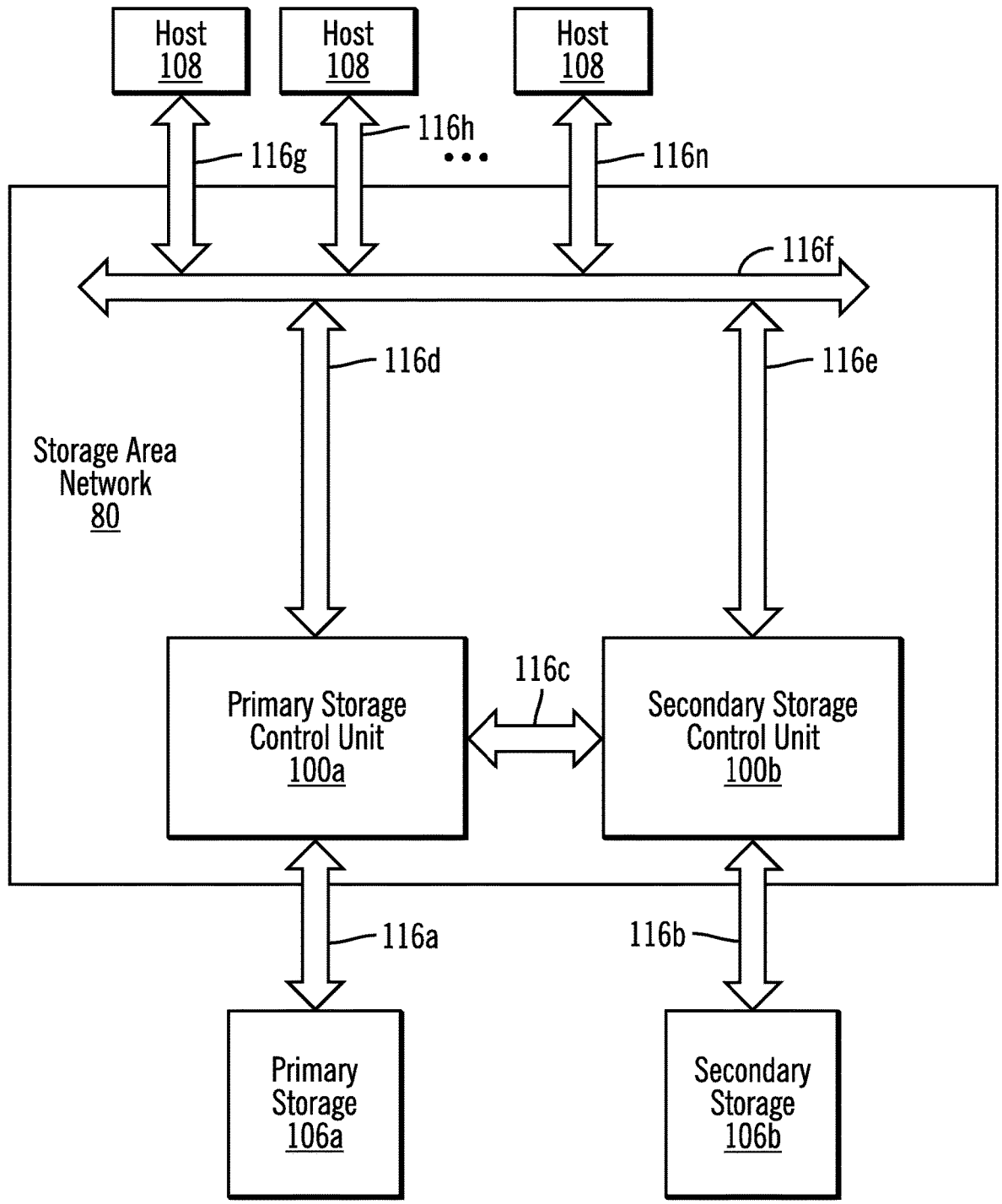
FIG. 1B illustrates another embodiment of a storage environment, employing aspects of targeted secure data overwriting in accordance with the present description.

The storage control unit 100 communicates with the storage 106 via connection 116. The components of the embodiment depicted in FIG. 1B are similarly interconnected by connections 116a, 116b . . . 116n. The connections 116, 116a, 116b . . . 116n each may comprise one or more networks, such as a Local Area Network (LAN), Storage Area Network (SAN), Wide Area Network (WAN), peer-to-peer network, wireless network, etc. Alternatively, the connections 116, 116a, 116b . . . 116n may comprise bus interfaces, such as a Peripheral Component Interconnect (PCI) bus or serial interface. The connections 116, 116a, 116b . . . 116n may employ various communication links and protocols such as fiber channel links and the Fibre Connection (FICON) communication protocol, for example. It is appreciated that targeted secure data overwriting for a storage area network in accordance with the present description may be applied to other types of communication links and protocols. For example, targeted secure data overwriting in accordance with the present description may be utilized for components complying with the Extended Link Services (ELS) protocol.

The computing environment of FIGS. 1A, 1B includes multiple processing nodes within the hosts 108 and the storage area network 80. Aspects of targeted secure data overwriting in accordance with the present description for the storage area network 80 may be implemented in one or more of such processing nodes. For example, each storage control unit 100 (FIG. 1A) includes a processor 130, and a memory 131 which may include an operating system 132 and various software applications. The operating system 132 may comprise the IBM z/OS® operating system or other operating systems for managing storage devices in a storage area network. In one embodiment, a storage control unit 100 may optionally include targeted secure data overwrite control logic 134 configured for data cleaning memory resources targeted for secure data cleaning such as, for example, selected storage volumes (or portions of storage volumes) of the storage 106 controlled by the storage control unit 100 of the storage area network 80. Additional examples of memory resources which may be targeted for secure data cleaning include selected buffers 136 or other memory locations within data paths of the storage area network 80. The control logic 134 may be implemented with hardware, software, firmware or any combination thereof. Thus targeted secure data overwrite control logic 134 may be separate from the operating system 132 or may be included within the operating system 132, for example.

The storage area network 80 further comprises a plurality of switches 138 which are configured to switch data paths within the storage area network to provide for data transfers from a selected host 108 to a selected storage control unit 100, or between selected storage control units 100. In this embodiment, each switch 138 includes a processor 140, and a memory 141 which may include an operating system 142 and may include various software applications. The operating system 142 may comprise an appropriate switch operating system or other operating systems for managing data paths in a storage area network. In one embodiment, a switch 138 may optionally include targeted secure data overwrite control logic 144 in addition to or instead of the targeted secure data overwrite control logic 134 of a storage control unit 100, to manage aspects of data cleaning of memory resources targeted for secure data cleaning such as, for example, selected buffers 146 or other memory locations within data paths of the storage area network 80. The control logic 144 may be implemented with hardware, software, firmware or any combination thereof. Thus targeted secure data overwrite control logic 144 may be separate from the operating system 142 or may be included within the operating system 142, for example.

In this embodiment, each host 108 includes a processor 150, and a memory 151 which may include an operating system 152 and various software applications. The operating system 152 may comprise the IBM z/OS® operating system or other operating systems for managing input/output operations through a storage area network. (IBM and z/OS are trademarks of IBM worldwide).

An optional targeted secure data overwrite control logic 154 of a host 108 manages aspects of data cleaning of memory resources targeted for secure data cleaning such as, for example, selected buffers 156 or other memory locations within data paths of the host 108 to the storage area network 80, and may be implemented with hardware, software, firmware or any combination thereof. Thus targeted secure data overwrite control logic 154 may be separate from the operating system 152 or may be included within the operating system 152, for example. Further, targeted secure data overwrite control logic 154 may be in addition to or instead of a targeted secure data overwrite control logic 134 of a storage control unit 100 or a targeted secure data overwrite control logic 144 of a switch 138.

Figure 2:
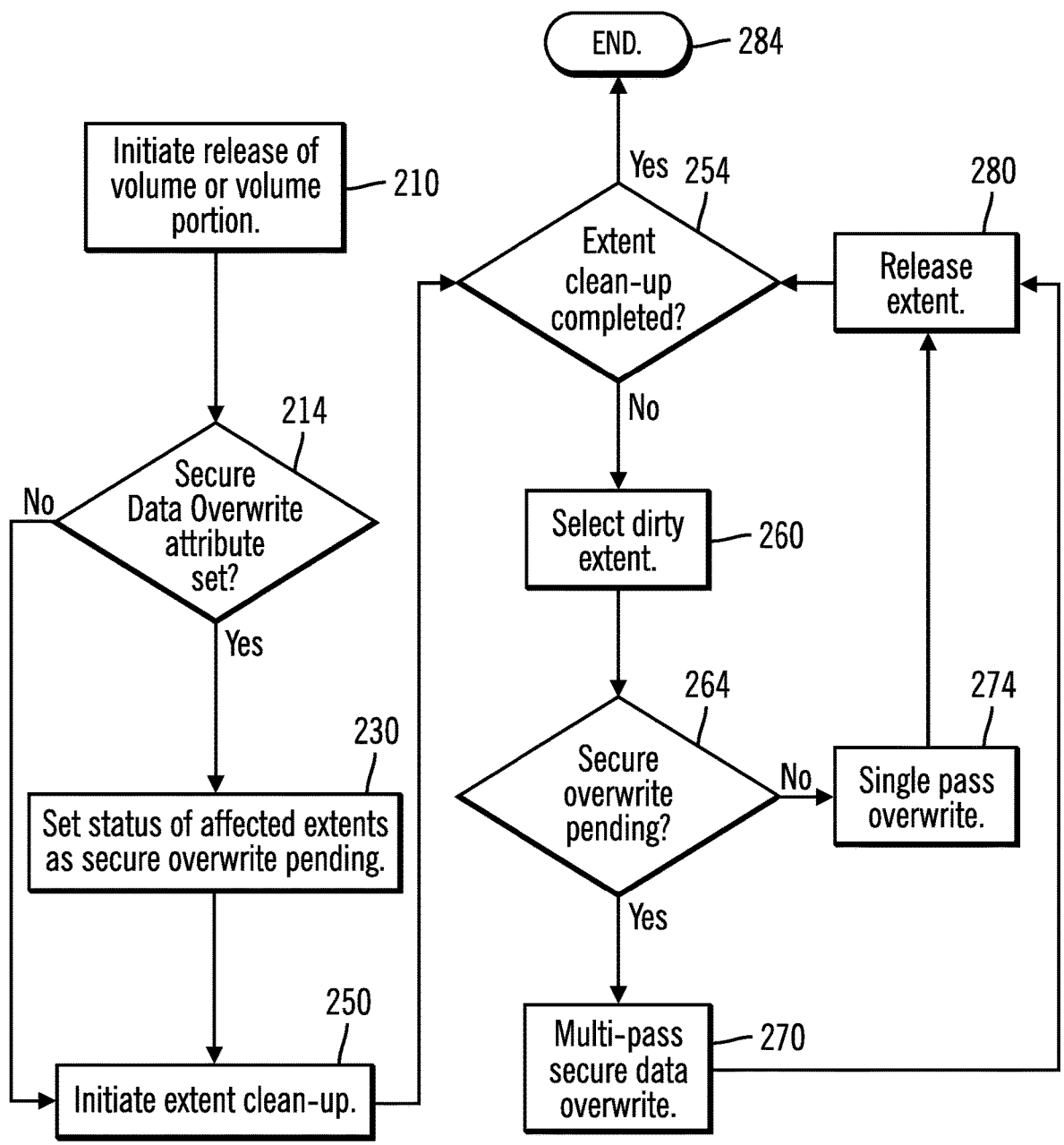
FIG. 2 illustrates one embodiment of operations of targeted secure data overwriting in accordance with the present description.
Figure 3:
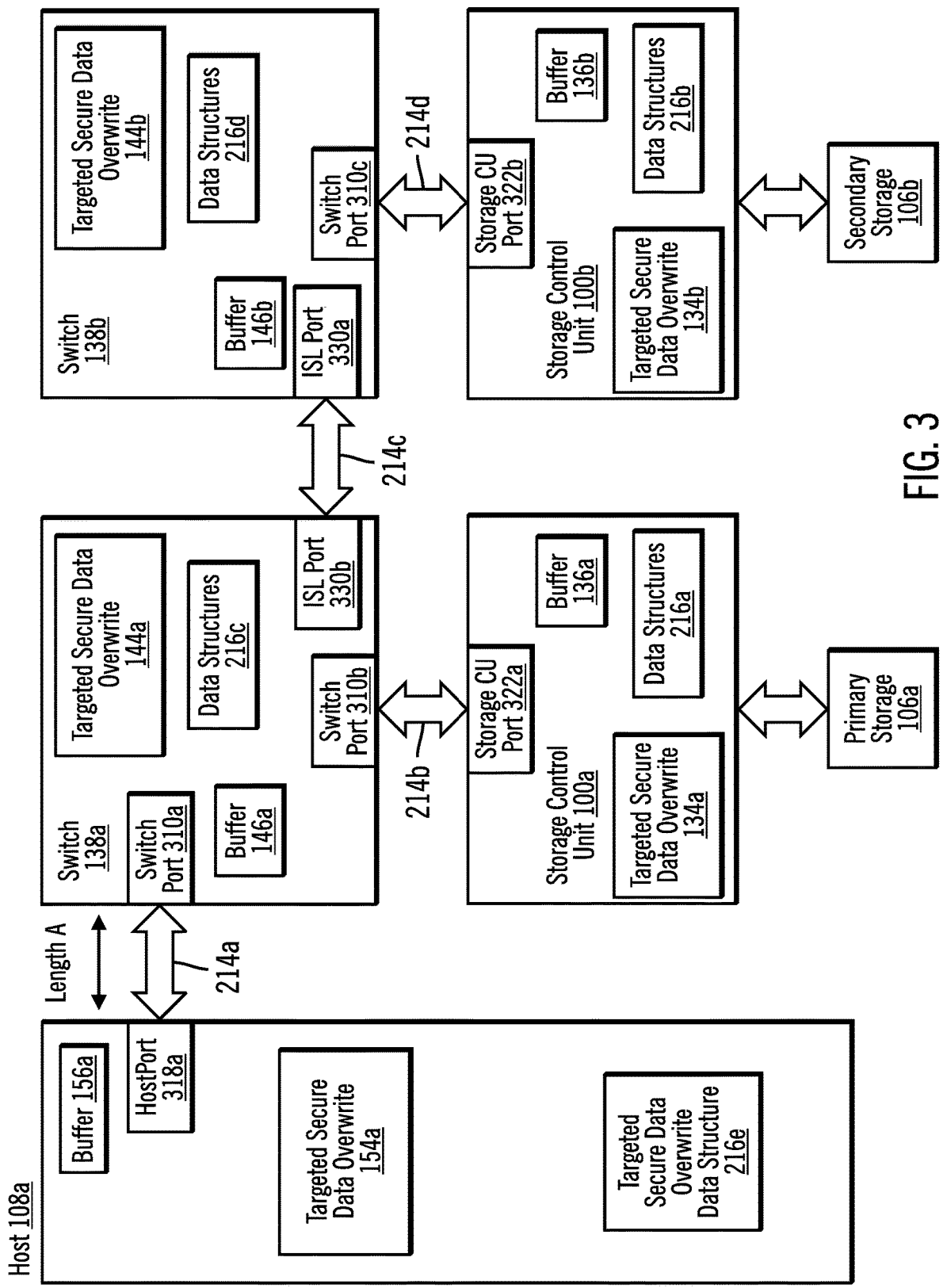
FIG. 3 illustrates another embodiment of a storage environment, employing aspects of targeted secure data overwriting in accordance with the present description.

FIG. 2 shows an example of operations of a targeted secure data overwrite control logic such as, for example, the targeted secure data overwrite control logic 134a (FIG. 3) of the storage control unit 100a of FIG. 3. The operations of FIG. 2 are initiated (block 210, FIG. 2) in connection with an impending release of a storage volume of the storage 106a controlled by the storage control unit 100a. Although described in connection with the release of an entire storage volume, it is appreciated that in some embodiments, the release of a portion of a storage volume, such as one or more extents, tracks, cylinders, sectors etc. of the storage volume, may initiate operations similar to those depicted in FIG. 2.

A storage volume may be released to free the memory locations or storage space occupied by the storage volume, for use by other storage volumes. Thus, memory locations of a storage volume may be released in connection with the deletion of a storage volume or the migration of data stored in the storage volume to another location within the storage 106a or another storage, for example.

In one embodiment of the present description, a particular storage volume may be targeted for secure data overwriting by setting an appropriate metadata attribute of the storage volume to indicate that the memory locations assigned to the associated storage volume have been targeted for secure data overwriting before the memory locations are released for use by other parties, processes or volumes. Accordingly, if the storage volume (or a portion of a storage volume) is to be moved, deleted or otherwise released, a determination (block 214, FIG. 2) may be made as to whether a secure data overwrite target metadata attribute has been set for the particular storage volume.

Figure 4:
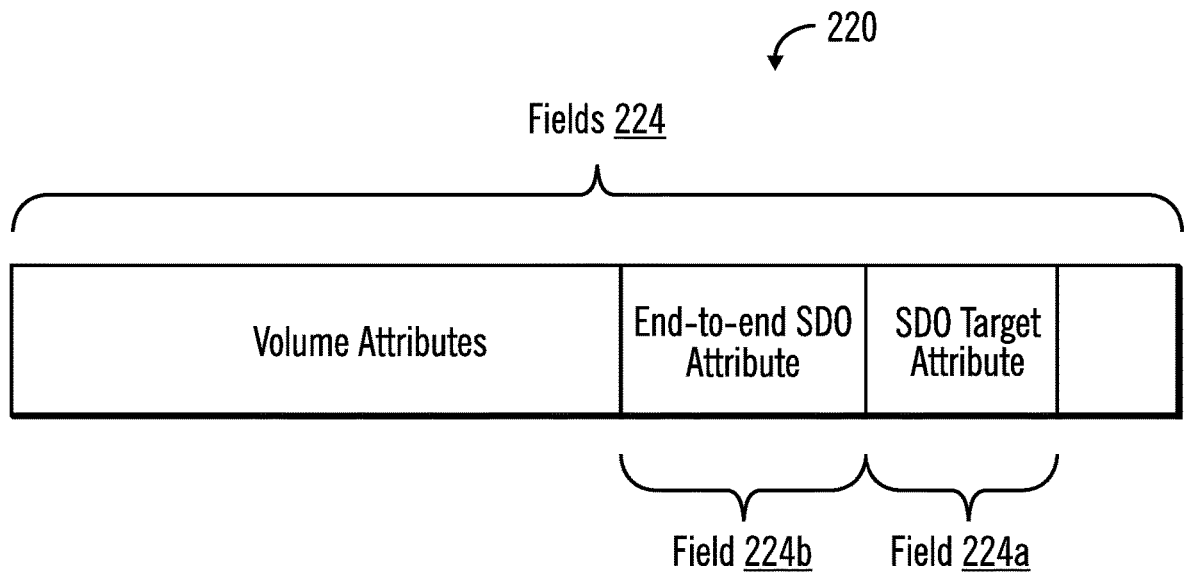
FIG. 4 illustrates one embodiment of a data structure storing metadata attributes for a storage volume employing aspects of targeted secure data overwriting in accordance with the present description.

In the embodiment of FIG. 3, the storage control unit 100a includes a memory 131 (FIG. 1A) configured to store data structures 216a (FIG. 3) including a data structure 220 (FIG. 4) having fields 224, the contents of which indicate metadata attributes of one or more storage volumes of the storage 106a. The other processing nodes of the storage control unit 100b, switch 138a, switch 138b and host 108a, for example, may also include suitable data structures 216b, 216c, 216d, 216e, respectively, having data structures such as the data structure 220 (FIG. 4).

The metadata attributes of the data structure 220 for a particular storage volume may include for example, a storage volume name or other identification, storage volume size, storage volume type, and the locations of the extents, sectors, segments, or other memory locations assigned to the storage volume. In accordance with one aspect of the present description, the metadata attributes for a particular storage volume include a secure data overwrite (SDO) target attribute stored in a field 224a of the data structure 220 in the example of FIG. 4. The secure data overwrite target attribute of field 224a when set, indicates that the memory locations assigned to the associated storage volume have been targeted for secure data overwriting before the memory locations are released for use by other parties, processes or volumes.

Accordingly, the targeted secure data overwrite logic 134a (FIG. 3) is further configured to determine (block 214 (FIG. 2) whether a secure data overwrite target metadata attribute of the storage volume to be released, has been set. Thus in the example of FIGS. 2-4, the targeted secure data overwrite logic 134a (FIG. 3) is configured to inspect the field 224a (FIG. 4) of the metadata attributes data structure 220 of the selected volume to be released, to determine (block 214, FIG. 2) whether a secure data overwrite target metadata attribute of the storage volume to be released, has been set. If so, the status of each of the memory locations assigned to the storage volume to be released, are set (block 230) as pending secure data overwriting of those memory locations.

In the illustrated embodiment, the storage capacity of the storage 106a is defined in units of data referred to as volumes. Each volume includes one or more subunits of data referred to herein as extents. In the context of disk storage, each extent includes one or more contiguous tracks. It is appreciated that targeted secure data overwriting may be applied to data units and data subunits of other types as well, depending upon the particular application.

Figure 5:
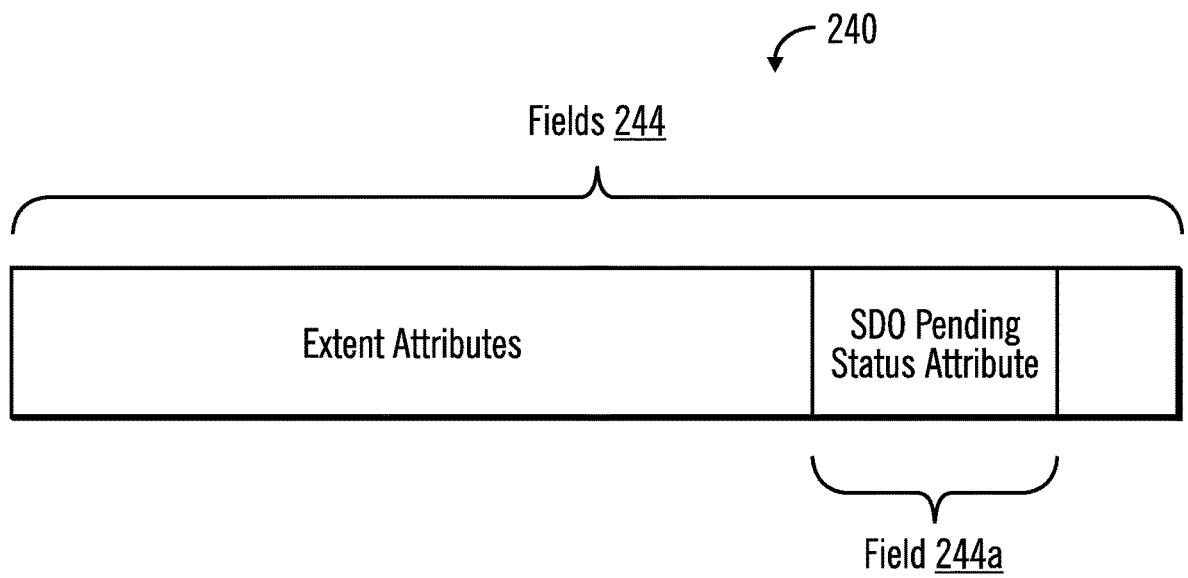
FIG. 5 illustrates one embodiment of a data structure storing metadata attributes of extents for storage volumes employing aspects of targeted secure data overwriting in accordance with the present description.

Accordingly, in this embodiment, the data structures 216a (FIG. 3) further include a data structure 240 (FIG. 5) having fields 244, the contents of which indicate various metadata attributes of one or more extents of one or more storage volumes of the storage 106a (FIG. 3). The metadata attributes stored in the data structure 240 for a particular extent for a particular storage volume may include for example, an extent name, number, location (or other identification), extent size, extent type, etc. In accordance with one aspect of the present description, the metadata attributes stored for a particular extent of a particular storage volume further include a secure data overwrite (SDO) pending status attribute, as indicated by the contents of a field 244a (FIG. 5) of the data structure 240 in the example of FIG. 5. The secure data overwrite pending status attribute of field 244a when set, indicates that the status of the memory locations assigned to the associated extent are pending the performance of a secure data overwriting operation to securely erase the contents of those memory locations before the memory locations are released for use by other parties, processes or volumes.

Thus, in this embodiment, the targeted secure data overwrite logic 134a (FIG. 3) is further configured to, in response to a determination (block 214, FIG. 2) that the secure data overwrite target metadata attribute of the storage volume to be released, has been set, to set (block 230, FIG. 2) the status field 244a of the data structure 240 for each extent, sector, segment, or other memory location assigned to the particular storage volume to be released. More specifically, the targeted secure data overwrite logic 134a (FIG.

3) is configured to set the status of each extent or other memory locations of the storage volume to be released, as pending multi-pass secure data overwriting of each such extent or memory location, if the secure data overwrite target metadata attribute of the storage volume to be released, has been set.

Subsequent to initiating (block 250, FIG. 2) clean-up of the extents of the storage volume to be released, the targeted secure data overwrite logic 134a (FIG. 3) is further configured to determine (block 254) whether the clean-up of the extents has been completed. As used herein, the term "clean-up" of an extent or other memory location or locations includes erasing or otherwise destroying the contents of each such memory location.

If the clean-up operations for the extents to be released have not been completed (block 254), a "dirty" extent is selected (block 260) by the targeted secure data overwrite logic 134a (FIG. 3) for clean-up. As used herein, the term "dirty" refers to memory locations in which the contents of those memory locations have not yet been cleaned-up and otherwise made ready to be released. In the illustrated embodiment, the targeted secure data overwrite logic 134a (FIG. 3) is further configured to determine (block 264, FIG. 2) whether a status of a memory location such as a selected dirty extent, indicates that memory location as pending a multi-pass secure data overwriting. Thus in the example of FIGS. 2-5, the targeted secure data overwrite logic 134a (FIG. 3) is configured to inspect the field 244a (FIG. 5) of the metadata attributes data structure 240 of the selected dirty extent, to determine (block 264, FIG. 2) if the status of the selected dirty extent is pending a secure data overwriting. The targeted secure data overwrite logic 134a (FIG. 3) is further configured to, in response to a determination that the status of the selected dirty extent has been set to indicate the status as pending a multi-pass secure data overwriting, to perform (block 270, FIG. 2) a multi-pass secure data overwriting of the selected dirty extent.

In this manner, the targeted secure data overwrite logic 134a (FIG. 3) is configured to, in response to a determination (block 214, FIG. 2) that the secure data overwrite target metadata attribute of a storage volume to be released has been set, to perform (block 270, FIG. 2) a more secure clean up, such as a multi-pass secure data overwriting, for example, of each dirty extent of that storage volume before the extents of that storage volume are released. Conversely, if it is determined (block 264) that the status of the selected dirty extent has not been set to indicate the status as pending a multi-pass secure data overwriting, a less secure clean up may be performed (block 274) for the selected extent or other memory location such as a single pass overwrite, for example. It is appreciated that in some applications, a less secure clean up may be performed (block 274) for the selected extent or other memory location, in which no overwriting is performed.

Once an extent has been cleaned up as appropriate, either a more secure clean-up (block 270) or a less secure clean-up (block 274), the selected extent may be released (block 280). If the extent clean-up has been completed (block 254), the clean-up may be terminated (block 284). Otherwise, clean-up operations continue as discussed above. In this manner, all the extents of a storage volume for which the secure data overwrite target metadata attribute of the storage volume to be released has been set, may be securely cleaned utilizing a more secure clean-up such as secure data overwrite, regardless of which storage is housing each individual extent of the storage volume. Although described in connection with extents, it is appreciated that targeted secure data overwrite as described herein may be applied to other data subunits of a volume such as sectors, segments, tracks, etc.

For many types of non-volatile memory locations such as magnetic disk storage locations, for example, clean-up typically includes writing patterns of zeros, ones or other patterns of data to overwrite the original contents of the memory location so as to destroy the original contents as they existed prior to initiation of the overwriting operations at those memory locations. It is appreciated that the level of clean-up may vary. For example, an overwrite pattern may be written to the memory locations in a single pass. However, because the memory locations may yet retain residual information that could allow some or all of the overwritten data to be nonetheless restored by an unauthorized process, a more secure clean-up of memory locations may include the targeted secure data overwrite logic 134a (FIG. 3) being configured to overwrite data using patterns of data in multiple passes over the memory locations to prevent or substantially prevent recovery of the contents of the memory locations as they existed prior to initiation of the overwriting operations at those memory locations.

It is appreciated that clean-up processes other than data overwriting may be employed, depending upon the particular application. For example, for non-volatile magnetic disk memory storage locations, large scale magnetic fields may be employed. For some types of volatile memory, the memory locations may be cleaned up by removing power from the volatile memory locations, for example. In encrypting storage such as Self Encrypting Drives (SED), for example, a Cryptographic Erase may be employed in the clean-up.

In another aspect of the present description, selected data transfers and the buffers and other memory locations employed for the data transfers may be targeted for secure data overwriting in accordance with the present description. In one embodiment, an appropriate metadata attribute of a storage volume may be set to indicate that the memory locations employed for data transfers to or from the storage volume have been targeted for end-to-end secure data overwriting. Accordingly, the metadata attributes stored for a particular storage volume may further include an end-to-end secure data overwrite (SDO) attribute, as indicated by the contents of a field 224b (FIG. 4) of the data structure 220 in the example of FIG. 4. The end-to-end secure data overwrite (SDO) attribute of field 224b when set, indicates that memory locations employed for data transfers to or from the associated storage volume have been targeted for end-to-end secure data overwriting. Thus, memory locations targeted for end-to-end secure data overwrite (SDO) may include buffers in a host or host I/O adapter, buffers in a switch or switch I/O adapter in the network fabric, buffers in a storage control unit or storage control unit I/O adapter, cache pages in the storage subsystem, etc.

Figure 6A:
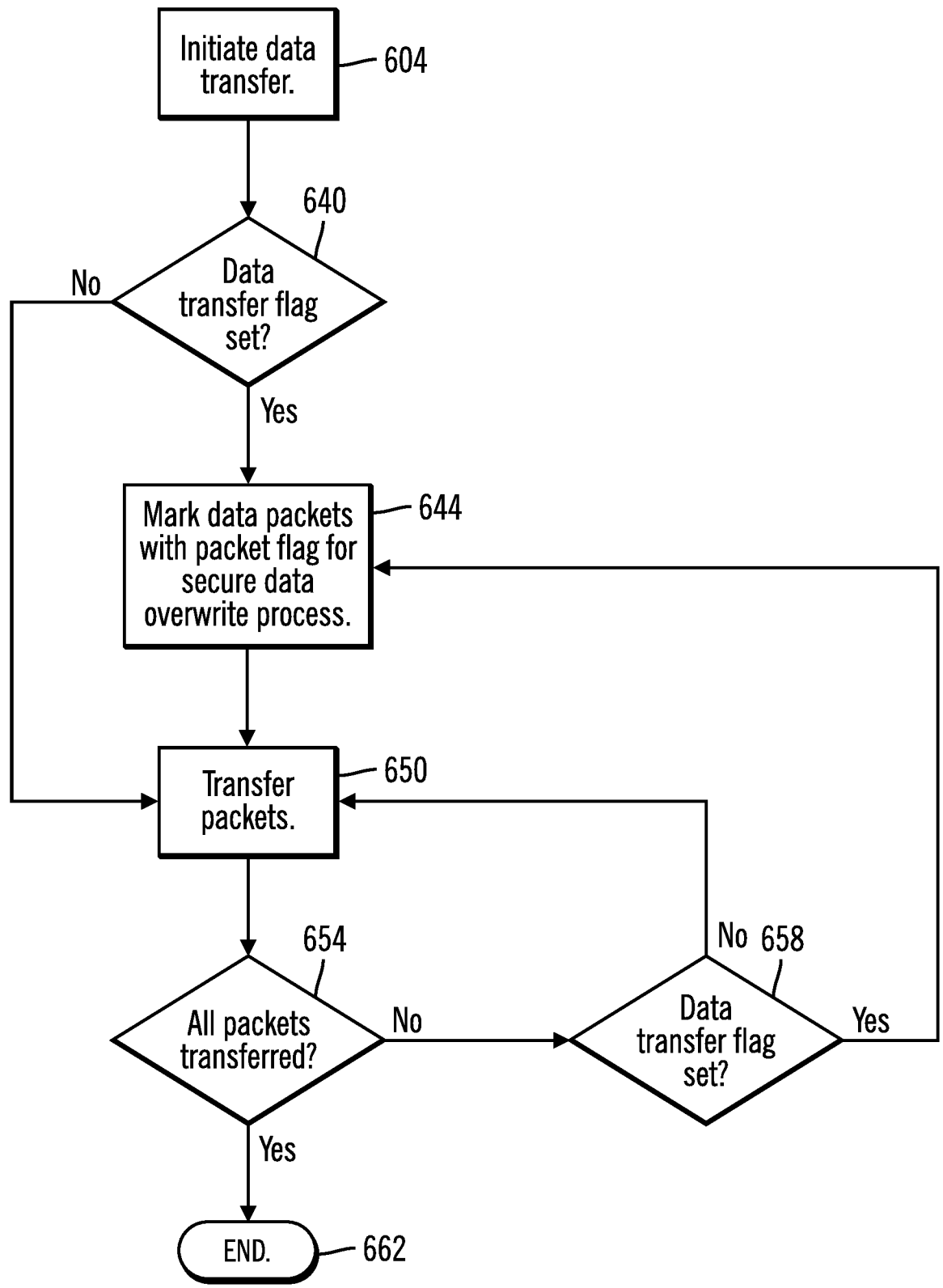
FIG. 6a illustrates another embodiment of operations of targeted secure data overwriting in accordance with the present description.

FIG. 6a provides one example of operations of a data transfer initiated (block 604) by a host 108 (FIG. 3), for example, in which data is transferred from a source such as memory location of the host 108, for example, to a target location such as a storage 106a, for example. A targeted secure data overwrite control logic 154a (FIG. 3) of the host 108a may be configured to initiate a data transfer by, for example, sending an appropriate data transfer request such as a command, for example, to the storage control unit 100a which controls the storage 106a. The data transfer request may identify whether the requested data transfer is a read operation or a write operation, and may identify the source of the data, and the destination of the data, as well as other parameters of the data transfer.

Figure 6B:
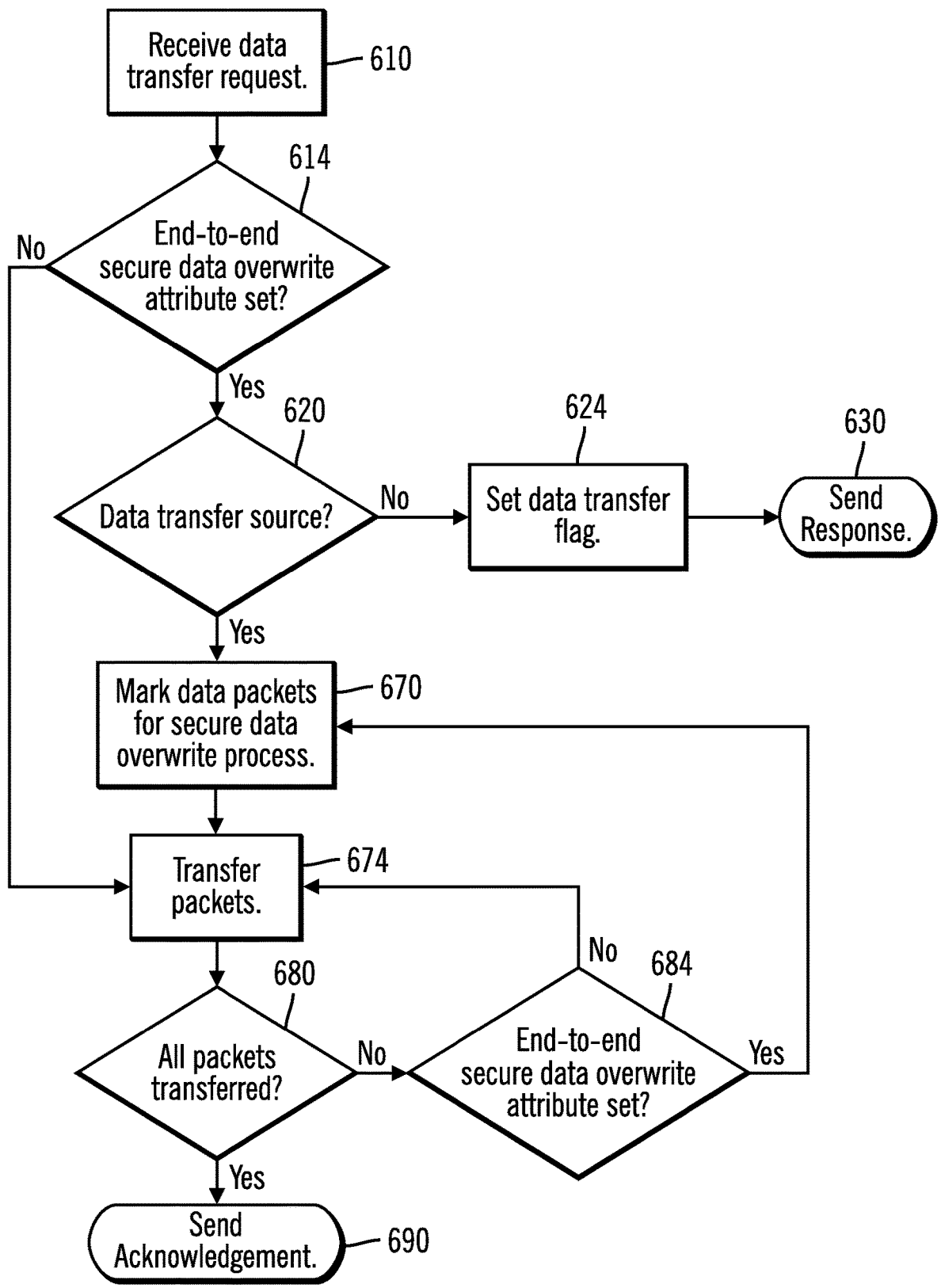
FIG. 6b illustrates still another embodiment of operations of targeted secure data overwriting in accordance with the present description.

FIG. 6b provides one example of operations of a data transfer by a storage control unit, such as the storage control unit 100a (FIG. 3) in response to initiation of a data transfer request by a host 108a. Upon receipt (block 610) of the data transfer request from the host 108a (FIG. 3), the targeted secure data overwrite control logic 134a of the storage control unit 100a determines (block 614, FIG. 3) whether an end-to-end secure data overwrite attribute has been set for a storage volume of the storage 106a, which has been identified by the data transfer request as a source or destination volume. Accordingly, targeted secure data overwrite control logic 134a of the storage control unit 100a is configured to examine the field 224b (FIG. 4) of the data structure 220, to determine (block 614, FIG. 3) whether an end-to-end secure data overwrite attribute has been set for a source or destination storage volume of the storage 106a.

If so, the targeted secure data overwrite control logic 134a of the storage control unit 100a is further configured to determine (block 620) whether the storage 106a controlled by the storage control unit 100a is the source of the data transfer, and if not, to set (block 624) a data transfer secure data overwrite (SDO) flag to indicate to the data transfer requester, a host 108a in this example, that the data transfer is to be performed utilizing end-to-end secure data overwriting of memory locations along the data transfer path.

Figure 7:
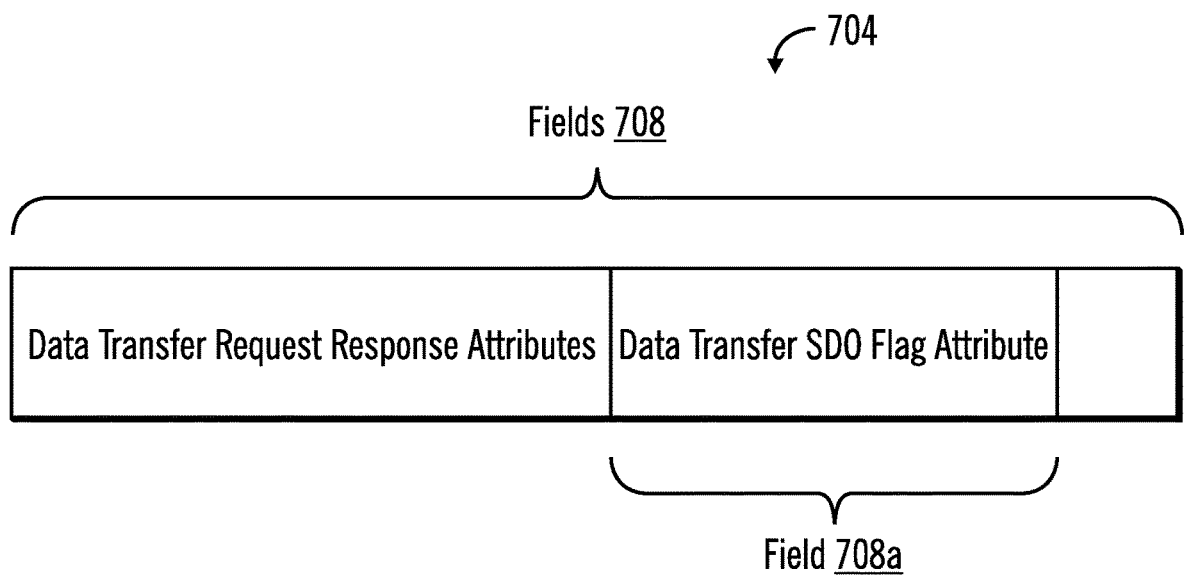
FIG. 7 illustrates one embodiment of a format of a response to a data transfer instruction employing aspects of targeted secure data overwriting in accordance with the present description.

FIG. 7 shows an example of a format of a response 704 which may be generated by the storage control unit 100a in response to a request for a data transfer, from a data transfer requester such as a host 108a. In the illustrated embodiment, the data transfer request response 704 includes a plurality of fields 708 which contain various data transfer request response attributes which may include a data transfer secure data overwrite (SDO) flag attribute stored in a field 708a. Accordingly, the targeted secure data overwrite control logic 134a of the storage control unit 100a is further configured to set (block 624, FIG. 6b) the data transfer SDO flag attribute in the field 708a of the response 704, and transfer (block 630, FIG. 6b) the response 704 to the data transfer requester, to indicate to the data transfer requester, a host 108a in this example, that the data transfer is to be performed utilizing end-to-end secure data overwriting of memory locations along the data transfer path.

In response to receipt of the response 704, the targeted secure data overwrite control logic 154a (FIG. 3) of the host 108a may be configured to examine the response 704 from the storage control unit 100a, and determine (block 640, FIG. 6a) whether the data transfer SDO flag has been set. If so, the targeted secure data overwrite control logic 154a (FIG. 3) of the host 108a is configured to mark (block 644, FIG. 6a) the data packets to be transferred for the end-to-end secure data overwrite (SDO) processing as described below.

Figure 8:
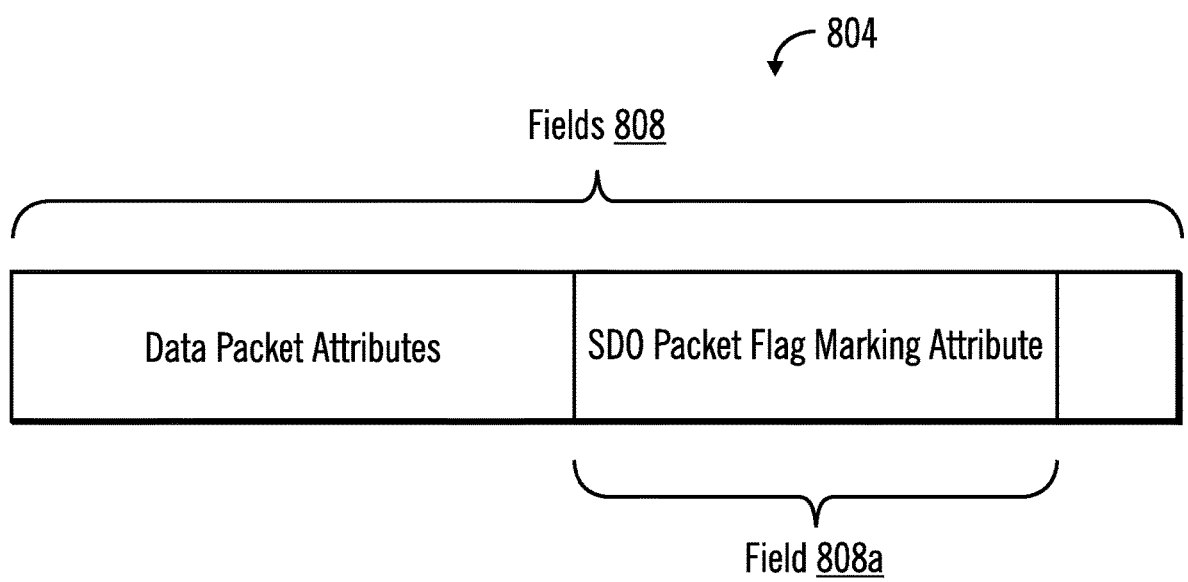
FIG. 8 illustrates one embodiment of a format of a data packet of a data transfer operation employing aspects of targeted secure data overwriting in accordance with the present description.

FIG. 8 shows an example of a format of a data packet 804 which may be generated by the source of a data transfer such as a host 108a, or control unit 100, for example. In the illustrated embodiment, the data packet 804 includes a plurality of fields 808 which contain various data packet attributes such as a data packet header and a data packet payload containing the data to be transferred. The data packet attributes further include a secure data overwrite (SDO) packet flag or marking attribute stored in a field 808a of the data packet, which is marked (block 644, FIG. 6a) with a packet flag in response to a determination (block 640, FIG. 6a) that the data transfer SDO flag has been set. Accordingly, the targeted secure data overwrite control logic 154a (FIG. 3) of the host 108a is further configured to mark (block 644, FIG. 6a) the packet secure data overwrite (SDO) marking attribute in the field 808a of each data packet to be transferred, with a packet flag to indicate that the data packets of the data transfer are to be processed utilizing end-to-end secure data overwriting of memory locations along the data transfer path. More specifically, a multi-pass secure data overwriting is to be performed at intermediate memory locations such as buffers temporarily storing the data packets in connection with the transfer operation.

As the flag-marked data packets are transferred (block 650, FIG. 6a), the targeted secure data overwrite control logic 154a (FIG. 3) of the host 108a is further configured to determine (block 654, FIG. 6a) whether all data packets of the data transfer have been transferred to the target location. If not, the targeted secure data overwrite control logic 154a (FIG. 3) of the host 108a determines (block 658, FIG. 6a) if the data transfer flag has been set. If so, the targeted secure data overwrite control logic 154a (FIG. 3) of the host 108a continues to mark (block 644, FIG. 6a) the packet secure data overwrite (SDO) marking attribute in the field 808a of each data packet to be transferred, with a packet flag to indicate that the data packets of the data transfer are to be processed utilizing end-to-end secure data overwriting of memory locations along the data transfer path. If it is determined (block 640, 658, FIG. 6a) that the data transfer flag has not been set for the data transfer, the data packets are transferred (block 650) without the data packets being marked with a packet flag for end-to-end secure data overwriting of memory locations along the data transfer path. Once all data packets have been transferred (block 654, FIG. 6a), the data transfer is complete (block 662).

In a similar manner, if it is determined (block 614, FIG. 6b) that an end-to-end secure data overwrite flag metadata attribute has been set for a volume of the data transfer and if it is determined (block 620, FIG. 6b) that the source of the data of the requested transfer is to be the storage 106a, for example, instead of the host 108a, for example, the targeted secure data overwrite control logic 134a (FIG. 3) of the storage control unit 100a is further configured to mark (block 670, FIG. 6b) the packet secure data overwrite (SDO) marking attribute in the field 808a of each data packet to be transferred, with a packet flag to indicate that that the data packets of the data transfer are to be processed utilizing end-to-end secure data overwriting of memory locations along the data transfer path. More specifically, a multi-pass secure data overwriting is to be performed at intermediate memory locations such as buffers temporarily storing the data packets in connection with the transfer operation.

As the marked data packets are transferred (block 674, FIG. 6b), the targeted secure data overwrite control logic 134a (FIG. 3) of the storage control unit 100a is further configured to determine (block 680, FIG. 6b) whether all data packets of the data transfer have been transferred to the target location. If not, the targeted secure data overwrite control logic 134a (FIG. 3) of the storage control unit 100a determines (block 684 FIG. 6b) if the end-to-end secure data overwrite attribute has been set for either a source volume or a destination volume for the data transfer. If so, the targeted secure data overwrite control logic 134a (FIG. 3) of the storage control unit 100a continues to mark (block 670, FIG. 6b) the packet secure data overwrite (SDO) marking attribute in the field 808a of each data packet to be transferred, with a packet flag to indicate that the data packets of the data transfer are to be processed utilizing end-to-end secure data overwriting of memory locations along the data transfer path. If it is determined (block 684, FIG. 6b) that the end-to-end secure data overwrite attribute has not been set for either a source volume or a destination volume for the data transfer, the data packets are transferred (block 674)

without the data packets being marked with a packet flag for end-to-end secure data overwriting of memory locations along the data transfer path. Once all data packets have been transferred (block 680, FIG. 6*b*), the data transfer is complete and an acknowledgement may be sent (block 690) to the data transfer requester (block 690). The targeted secure data overwrite logic 134*b* of the storage control unit 100*b* may be configured to operate in a similar manner for data transfers from the data storage 106*b*.

In certain computing environments, a storage area network provides data paths between multiple host systems and multiple storage control units controlling multiple storage devices. The data paths through the storage area network typically include switches and communication links which may be formed of fiber optic or other types of cables or may be wireless, for example. In addition, switches and other components of a storage area network 80 typically have ports, each port being coupled to a communication link interconnecting the component to a host or another component of the storage area network.

Further, data traversing a storage area network is frequently temporarily stored in one or more data buffers at various nodes of the storage area network. For example, a switch which couples selected communication links together may buffer data being received from one communication link connected to the switch in preparation for forwarding the buffered data to another communication link connected to the switch. Data may be buffered by the switch for a variety of reasons including the link speeds of the source and destination communication links connected to the switch may not match, or the destination link may be busy transmitting data from another source. Accordingly, data destined for that destination communication link may be buffered until the destination link is ready for it.

Thus, a data transfer operation may utilize intermediate memory locations between the source of the data of the transfer, and the target or destination of the data transfer operation. In one aspect of the present description, such intermediate memory locations which temporarily stored data packets having a secure data overwrite (SDO) packet flag, may be identified by a targeted secure clean-up process. For each such intermediate memory location identified as having stored data packets marked with a secure data overwrite (SDO) packet flag, multi-pass secure data overwriting may be employed to securely erase the identified intermediate memory locations of the data transfer operation.

FIG. 3 shows an example of a switch 138*a* of the storage area network 80, having a buffer 146*a* of the buffers 146 (FIG. 1A) and a switch port 310*a* coupled by a communication link 214*a* to a host port 318*a* for a host 108*a*, each of which is configured for data transfers in one or more data paths between the host 108*a* and the switch 138*a*. The port 310*a* may be a part of an I/O adapter, or a part of the switch 138*a* or another intermediate device. The buffers represented by the buffer 146*a* may be positioned within an I/O adapter of the switch 138*a* or within internal data paths of the switch 138*a*.

Similarly, the host 108*a* includes a buffer 156*a* of the buffers 156 (FIG. 1A), which is configured for data transfers in one or more data paths to or from the host 108*a*. The host port 318*a* may be a part of a host adapter, or a part of the host 108*a* or another intermediate device. The buffers represented by the buffer 156*a* may be positioned within an I/O adapter of the host 108*a* or within internal data paths of the host 108*a*.

The storage control unit 100*a* similarly has a buffer 136*a* of the buffers 136 (FIG. 1A), and the switch 138*a* of the storage area network 80 further has a switch port 310*b* coupled by a communication link 214*b* to a storage control unit port 322*a* for the storage control unit 100*a*, each of which is configured for data transfers in one or more data paths between host 108*a* and the storage control unit 100*a*, via the switch 138*a*. The switch port 310*a* may be a part of a device adapter, or a part of the storage control unit 100*a* or another intermediate device. The buffers represented by the buffer 136*a* may be positioned within an I/O adapter of the storage control unit 100*a* or within internal data paths of the storage control unit 100*a*.

A switch 138*b* of the storage area network 80, has a buffer 146*b* of the buffers 146 (FIG. 1A) and an inter switch link (ISL) port 330*a* coupled by a communication link 214*c* to an ISL port 330*b* of the switch 138*a*, each of which is configured for data transfers between the switch 138*a* and the switch 138*b*. The storage control unit 100*b* has a buffer 136*b* of the buffers 136 (FIG. 1A), and the switch 138*b* of the storage area network 80 further has a switch port 310*c* coupled by a communication link 214*d* to a storage control unit port 322*b* for the storage control unit 100*b*, each of which is configured for data transfers between host 108*a* and the storage control unit 100*b*, via the switches 138*a*, 138*b*.

Figure 9:
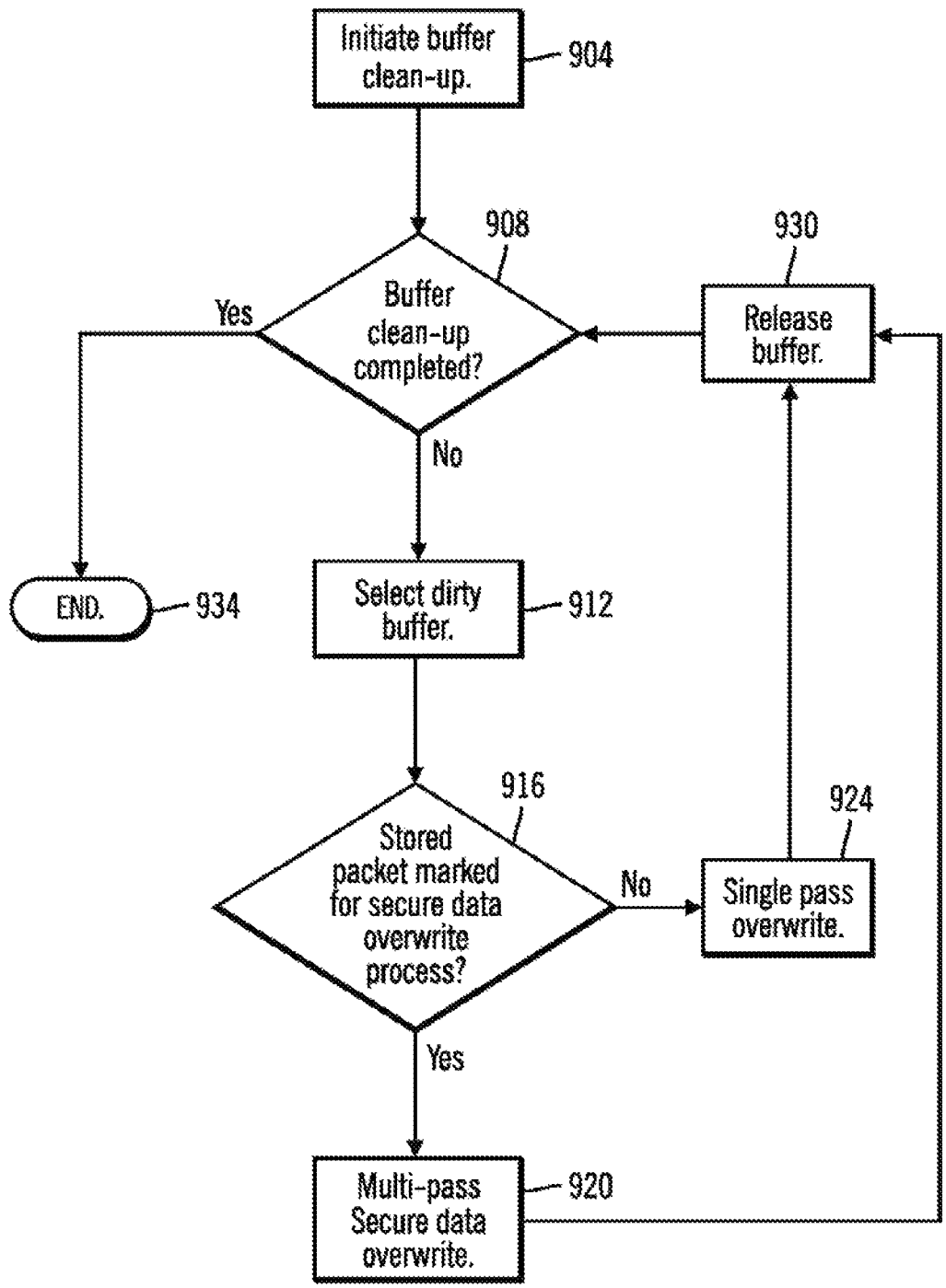
FIG. 9 illustrates another embodiment of operations of targeted secure data overwriting in accordance with the present description.

FIG. 9 depicts one example of operations of a processing node such as a switch 138*a* (FIG. 3), for example, having memory locations such as buffers 146*a*, for example, for temporarily storing data in a data transfer operation. Although described in connection with the buffers 146*a*, memory locations targeted for end-to-end secure data overwrite (SDO) may include buffers in a host or host I/O adapter, buffers in a switch or switch I/O adapter in the network fabric, buffers in a storage control unit or storage control unit I/O adapter, cache pages in the storage subsystem, etc.

In one aspect of the present description, a clean-up of temporary memory locations may be initiated (block 904, FIG. 9) for memory locations utilized for a data transfer. Although the operations of FIG. 9 are described in connection with the targeted secure data overwrite logic 144*a* of the switch 138*a*, it is appreciated that targeted secure data overwrite logic of other processing nodes as a switch 138*b* (FIG. 3), 138*b*, storage control unit 100*a*, 100*b* or host 108*a*, for example, having memory locations such as buffers 136*a*, 136*b*, 146*a*, 146*b*, 156*a*, for example, may operate in a similar manner for clean-up of memory locations temporarily storing data in a data transfer operation.

Subsequent to initiating (block 904, FIG. 9) clean-up of temporary memory locations such as buffers, the targeted secure data overwrite logic 144*a* (FIG. 3) of the switch 138*a* is further configured to determine (block 908) whether the clean-up of the memory locations such as one or more of the buffers 146*a* has been completed. As used herein, the term "clean-up" of a memory location or locations includes erasing or otherwise destroying the contents of each such memory location.

If the clean-up operations for memory locations to be released have not been completed (block 908), a "dirty" memory location is selected (block 912) by the targeted secure data overwrite logic 144*a* (FIG. 3) for clean-up. As used herein, the term "dirty" refers to memory locations in which the contents of those memory locations have not yet been cleaned-up or otherwise made ready for access by other users or processes.

In the illustrated embodiment, the targeted secure data overwrite logic 144*a* (FIG. 3) is further configured to determine (block 916, FIG. 9) whether a data packet stored at a selected dirty memory location such as a selected dirty buffer, has been marked with a packet flag for a secure data overwrite process such as a multi-pass secure data overwriting. Thus in the illustrated embodiment, the targeted secure data overwrite logic 144*a* (FIG. 3) is configured to inspect the field 808*a* (FIG. 8) of a packet 804 stored in the selected dirty buffer, to determine (block 916, FIG. 2) if the packet has been marked with a packet flag for a secure data overwrite process such as a multi-pass secure data overwriting. The targeted secure data overwrite logic 144*a* (FIG. 3) is further configured to, in response to a determination that the packet has been marked with a packet flag for a secure data overwrite process, to perform (block 920, FIG. 9) a multi-pass secure data overwriting of the selected dirty buffer.

In this manner, the targeted secure data overwrite logic 144*a* (FIG. 3) is configured to, in response to a determination (block 916, FIG. 9) that the packet has been marked with a packet flag for a secure data overwrite process, to perform (block 920, FIG. 9) a more secure clean up, such as a multi-pass secure data overwriting, for example, of the particular dirty buffer of the switch 138*a* (FIG. 3) containing a packet flag-marked packet, before the buffer is made available for access by other users or processes. Conversely, if it is determined (block 916) that the packet has not been marked with a packet flag for a secure data overwrite process, a less secure clean up may be performed (block 924) for the selected buffer or other memory location such as a single pass overwrite, for example. It is appreciated that in some applications, a less secure clean up may be performed (block 924) for the selected buffer or other memory location, in which no overwriting is performed.

Once a buffer has been cleaned up as appropriate, either a more secure clean-up (block 920) or a less secure clean-up (block 924), the selected buffer may be released (block 930) for access by other users or processes. If the buffer clean-up has been completed (block 908), the clean-up may be terminated (block 934). Otherwise, clean-up operations continue as discussed above. The targeted secure data overwrite control logic 134*a*, 134*b*, 144*b*, 154*a* of the other processing nodes of FIG. 3 may operate in a similar manner to that of the targeted secure data overwrite control logic 144*a* described above, to perform targeted secure data overwrite of data transfer memory locations, such as the buffers 136*a*, 136*b*, 146*b*, 156*a*, for example.

For many types of non-volatile memory locations such as buffers, for example, clean-up typically includes writing a patterns of zeros, ones or other patterns of data to overwrite the original contents of the memory location so as to destroy the original contents as they existed prior to initiation of the overwriting operations at those memory locations. It is appreciated that the level of clean-up may vary. For example, an overwrite pattern may be written to the memory locations in a single pass. However, because the memory locations may yet retain residual information that could allow some or all of the overwritten data to be nonetheless restored by an unauthorized process, a more secure clean-up of memory locations may include the targeted secure data overwrite logic 144*a* (FIG. 3) being configured to overwrite data using patterns of data in multiple passes over the memory locations to prevent or substantially prevent recovery of the contents of the memory locations as they existed prior to initiation of the overwriting operations at those memory locations.

It is appreciated that clean-up processes other than data overwriting may be employed. For example, for some types of volatile memory, the memory locations may be cleaned up by removing power from the volatile memory locations. Other clean-up techniques may be employed, depending upon the particular application.

Figure 10:
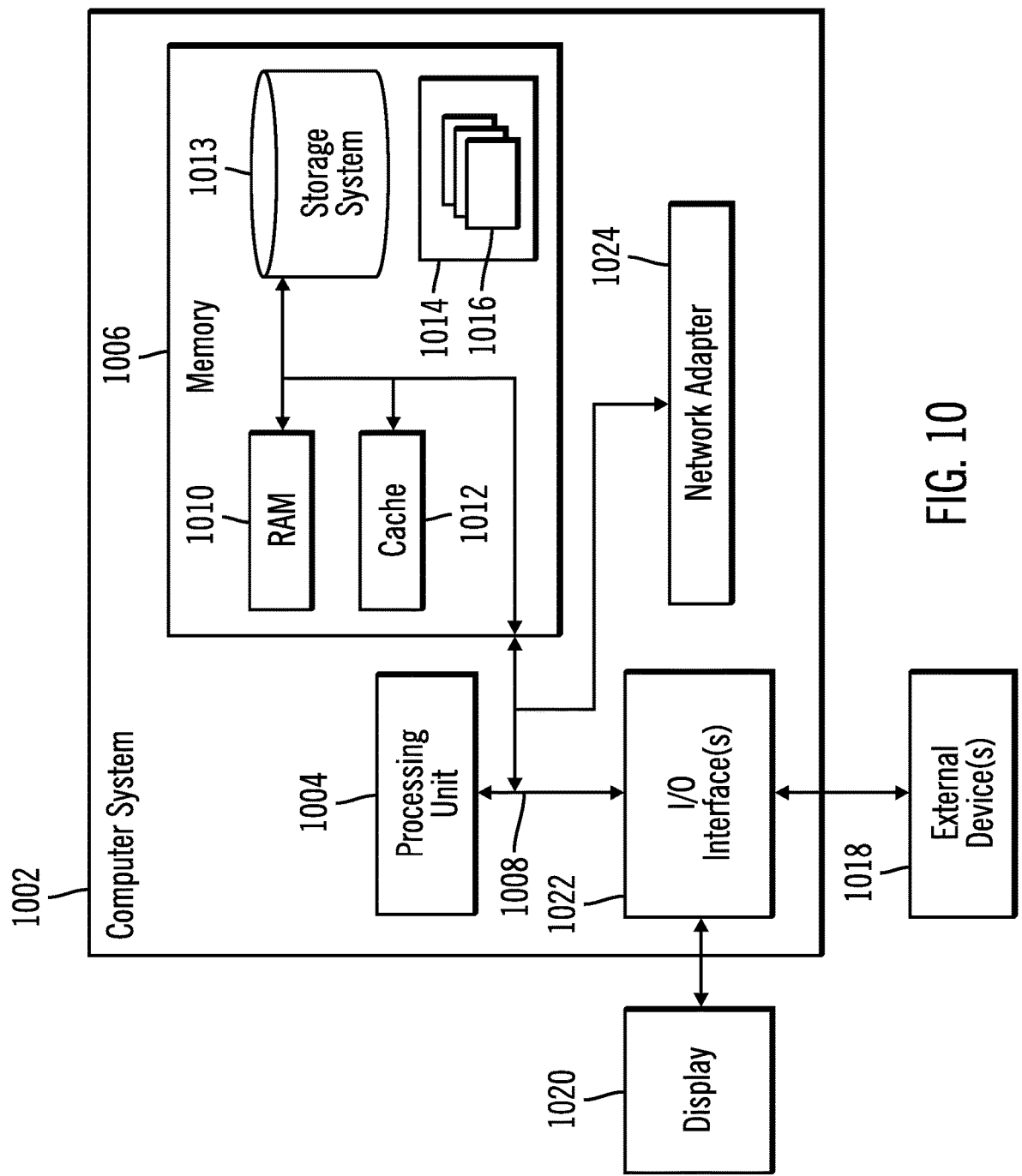
FIG. 10 illustrates a computing environment in which components of FIGS. 1A, 1B and 3 may be implemented.

The computational components of FIGS. 1A, 1B, and 3 including the host 108, 108*a*, switches 138, 138*a*, 138*b* and the controller or storage control unit 100, 100*a*, 100*b*, may each be implemented in one or more computer systems, such as the computer system 1002 shown in FIG. 10. Computer system/server 1002 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1002 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, the computer system/server 1002 is shown in the form of a general-purpose computing device. The components of computer system/server 1002 may include, but are not limited to, one or more processors or processing units 1004, a system memory 1006, and a bus 1008 that couples various system components including system memory 1006 to processor 1004. Bus 1008 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1002 typically includes a variety of computer system readable media. Such media may be any available media that is accessible by computer system/server 1002, and it includes both volatile and non-volatile media, removable and non-removable media.

System memory 1006 can include computer system readable media in the form of volatile memory, such as random access memory (RAM) 1010 and/or cache memory 1012. Computer system/server 1002 may further include other removable/non-removable, volatile/non-volatile computer system storage media. By way of example only, storage system 1013 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1008 by one or more data media interfaces. As will be further depicted and described below, memory 1006 may include at least one program product having a set (e.g., at least one) of program modules that are configured to carry out the functions of embodiments of the invention.

Program/utility 1014, having a set (at least one) of program modules 1016, may be stored in memory 1006 by way of example, and not limitation, as well as an operating system, one or more application programs, other program modules, and program data. Each of the operating system, one or more application programs, other program modules, and program data or some combination thereof, may include an implementation of a networking environment. The components of the computer 1002 may be implemented as program modules 1016 which generally carry out the functions and/or methodologies of embodiments of the invention as described herein. The systems of FIGS. 1A, 1B may be implemented in one or more computer systems 1002, where if they are implemented in multiple computer systems 1002, then the computer systems may communicate over a network.

Computer system/server 1002 may also communicate with one or more external devices 1018 such as a keyboard, a pointing device, a display 1020, etc.; one or more devices that enable a user to interact with computer system/server 1002; and/or any devices (e.g., network card, modem, etc.) that enable computer system/server 1002 to communicate with one or more other computing devices. Such communication can occur via Input/Output (I/O) interfaces 1022. Still yet, computer system/server 1002 can communicate with one or more networks such as a local area network (LAN), a general wide area network (WAN), and/or a public network (e.g., the Internet) via network adapter 1024. As depicted, network adapter 1024 communicates with the other components of computer system/server 1002 via bus 1008. It should be understood that although not shown, other hardware and/or software components could be used in conjunction with computer system/server 1002. Examples, include, but are not limited to: microcode, device drivers, redundant processing units, external disk drive arrays, RAID systems, tape drives, and data archival storage systems, etc.

The reference characters used herein, such as i, j, and n, are used to denote a variable number of instances of an element, which may represent the same or different values, and may represent the same or different value when used with different or the same elements in different described instances.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A method, comprising:
    data cleaning a first data subunit of memory locations of a first volume of a plurality of volumes of a data storage device to erase residual data stored in the first data subunit of memory locations, each particular volume of the plurality of volumes having a plurality of data subunits of memory locations assigned to a particular volume and a secure data overwrite target metadata attribute of a plurality of secure data overwrite target metadata attributes, identifying the particular volume and associated with the particular volume by volume identification and indicating when set, that all the data subunits of memory locations assigned to the particular identified volume have been targeted for a multi-pass secure data overwriting of the data subunits of memory locations at a first level of data security prior to being released, said data cleaning including:
        determining whether the associated secure data overwrite target metadata attribute of the first volume of the data storage device has been set; and
        in response to a determination that the associated secure data overwrite target metadata attribute of the first volume of the data storage device has been set, setting a data subunit status data structure for each data subunit of the first volume to indicate a status of each particular data subunit of memory locations of the first volume as pending a multi-pass secure data overwriting of the data subunit of memory locations;
        determining as a function of a first data subunit status data structure for the first data subunit of memory locations, a status of the first data subunit of memory locations as pending a multi-pass secure data overwriting of the first data subunit of memory locations, and in response to the first data subunit status determination, performing a multi-pass secure data overwriting of the first data subunit of memory locations at the first level of data security; and
        in response to a determination that the associated secure data overwrite target metadata attribute of the first volume of the data storage device has not been set, performing an erasure of the first data subunit of memory locations at a second level of data security less secure than the first level of data security.

2. The method of claim 1 wherein each data subunit is an extent of a volume so that the first data subunit is a first extent of memory locations and so that the data cleaning further includes in response to a determination that the associated secure data overwrite target metadata attribute of the first volume of the data storage device has been set, setting an extent status data structure indicating a status of the first extent of memory locations of the first volume to indicate the status of the first extent of memory locations as pending a multi-pass secure data overwriting of the first extent of memory locations.

3. The method of claim 2 wherein the data cleaning further includes determining the status of the first extent of memory locations as pending a multi-pass secure data overwriting of the first extent of memory locations, and in response to the extent status determination, performing a multi-pass secure data overwriting of the first extent of memory locations.

4. The method of claim 1 further comprising: in a first transfer operation, transferring data packets between the first volume and a second location, said transferring including:
   determining whether an end-to-end secure data overwrite metadata attribute of the first volume of the data storage device has been set; and
   in response to a determination that the end-to-end secure data overwrite metadata attribute of the first volume of the data storage device has been set, marking the data packets with a secure data overwrite packet flag to indicate a multi-pass secure data overwriting at intermediate memory locations between the first volume and the second location, said intermediate memory locations temporarily storing the data packets in the first transfer operation.

5. The method of claim 1 further comprising: in a first transfer operation, transferring data packets between the first volume and a second location, said transferring including:
   determining whether an end-to-end secure data overwrite metadata attribute of the first volume of the data storage device has been set; and
   in response to a determination that the end-to-end secure data overwrite metadata attribute of the first volume of the data storage device has been set, setting a secure data transfer flag for the first transfer operation to indicate a multi-pass secure data overwriting at intermediate memory locations between the first volume and the second location, said intermediate memory locations temporarily storing the data packets in the first transfer operation.

6. The method of claim 4 wherein the transferring data packets further includes:
   identifying intermediate memory locations between the first volume and the second location, which temporarily stored marked data packets in the first transfer operation; and
   multi-pass secure data overwriting identified intermediate memory locations between the first volume and the second location, which temporarily stored marked data packets in the first transfer operation.

7. The method of claim 5 wherein the transferring data packets further includes:
   in response to a determination that a data transfer flag for the first transfer operation has been set, marking the data packets with a secure data overwrite packet flag to indicate a multi-pass secure data overwriting at intermediate memory locations between the first volume and the second location, said intermediate memory locations temporarily storing the data packets in the first transfer operation;
   identifying intermediate memory locations between the first volume and the second location, which temporarily stored data packets marked with the secure data overwrite packet flag in the first transfer operation; and
   multi-pass secure data overwriting identified intermediate memory locations between the first volume and the second location, which temporarily stored data packets marked with the secure data overwrite packet flag in the first transfer operation.

8. An apparatus, comprising:
a data storage device having a plurality of data storage volumes, each particular data storage volume having a plurality of data subunits of memory locations assigned to a particular volume and a secure data overwrite target metadata attribute of a plurality of secure data overwrite target metadata attributes, identifying the particular volume and associated with the particular volume by volume identification and indicating when set, that all the data subunits of memory locations assigned to the particular identified volume have been targeted for a multi-pass secure data overwriting of the memory locations at a first level of data security prior to being released; and
a storage control unit having at least one of software, firmware and hardware including circuitry wherein said at least one is configured to control read operations from and write operations to the data storage device, said storage control unit including targeted secure data overwrite logic having at least one of software, firmware and hardware including circuitry wherein said at least one of targeted secure data overwrite logic is configured for data cleaning a first data subunit of memory locations of a first volume of the data storage device to erase residual data stored in the first data subunit of memory locations, and a memory configured to store a data structure indicating metadata attributes including a plurality of secure data overwrite target metadata attributes for the plurality of volumes wherein each volume of the plurality of volumes has an associated secure data overwrite target metadata attribute, and wherein said targeted secure data overwrite logic is further configured to:
   determine whether the associated secure data overwrite target metadata attribute of the first volume of the data storage device has been set; and to,
   in response to a determination that the associated secure data overwrite target metadata attribute of the first volume of the data storage device has been set, set a data subunit status data structure for each data subunit of the first volume to indicate a status of each particular data subunit of memory locations of the first volume as pending a multi-pass secure data overwriting of the data subunit of memory locations;
   determine as a function of a first data subunit status data structure for the first data subunit of memory locations, a status of the first data subunit of memory locations as pending a multi-pass secure data overwriting of the first data subunit of memory locations, and in response to the first data subunit status determination, perform a multi-pass secure data overwriting of the first memory location at the first level of data security; and
   in response to a determination that the associated secure data overwrite target metadata attribute of the first volume of the data storage device has not been set, perform an erasure of the first data subunit of memory locations at a second level of data security less secure than the first level of data security.

9. The apparatus of claim 8 wherein each data subunit is an extent of a volume so that the first data subunit is a first extent of memory locations and wherein the storage control unit further comprises a memory configured to store an extent status data structure indicating a status of the first extent of memory locations of the first volume including the status indicating the first extent of memory locations as pending a multi-pass secure data overwriting of the first extent of memory locations, said targeted secure data overwrite logic being further configured to, in response to a determination that the associated secure data overwrite target metadata attribute of the first volume of the data storage device has been set, set the extent status data structure indicating the status of the first extent of memory locations of the first volume to indicate the status of the first extent of memory locations as pending a multi-pass secure data overwriting of the first extent of memory locations.

10. The apparatus of claim 9 wherein said targeted secure data overwrite logic is further configured to determine whether the status of the first extent of memory locations indicates the first extent of memory locations as pending a multi-pass secure data overwriting of the first extent of memory locations, and to, in response to the extent status determination that the status of the first extent of memory locations has been set to indicate the status as pending a multi-pass secure data overwriting, perform a multi-pass secure data overwriting of the first extent of memory locations.

11. The apparatus of claim 8 wherein the memory configured to store a data structure indicating metadata attributes of the first volume, is further configured to store a data structure indicating an end-to-end secure data overwrite flag metadata attribute of the first volume of the data storage device, and said storage control unit is further configured to in a first transfer operation, transfer data packets between the first volume and a second location.

12. The apparatus of claim 11 wherein said targeted secure data overwrite logic is further configured to: determine whether the end-to-end secure data overwrite flag metadata attribute of the first volume of the data storage device has been set; and to,
in response to a determination that the end-to-end secure data overwrite flag metadata attribute of the first volume of the data storage device has been set, mark the data packets with a secure data overwrite packet flag to indicate a multi-pass secure data overwriting at intermediate memory locations between the first volume and the second location, said intermediate memory locations temporarily storing the data packets in the first transfer operation.

13. The apparatus of claim 11 wherein said targeted secure data overwrite logic is further configured to:
determine whether the end-to-end secure data overwrite flag metadata attribute of the first volume of the data storage device has been set; and
in response to a determination that the end-to-end secure data overwrite flag metadata attribute of the first volume of the data storage device has been set, set a secure data transfer flag for the first transfer operation to indicate a multi-pass secure data overwriting at intermediate memory locations between the first volume and the second location, said intermediate memory locations temporarily storing the data packets in the first transfer operation.

14. The apparatus of claim 11 further comprising a storage area network including a plurality of network components, wherein at least one network component includes at least one intermediate memory location between the first volume and the second location, and configured to temporarily store marked data packets in the first transfer operation, and at least one network component includes said targeted secure data overwrite logic having circuitry and configured to:
identify intermediate memory locations between the first volume and the second location, which temporarily stored marked data packets in the first transfer operation; and multi-pass secure data overwrite identified intermediate memory locations between the first volume and the second location, which temporarily stored marked data packets in the first transfer operation.

15. The apparatus of claim 12 further comprising a host configured to in the first transfer operation, transfer data packets to the first volume, said host including said targeted secure data overwrite logic having circuitry and configured to: determine whether a data transfer flag has been set for the first transfer operation; and to, in response to a determination that the data transfer flag for the first transfer operation has been set, mark the data packets with the secure data overwrite packet flag to indicate a multi-pass secure data overwriting at intermediate memory locations between the first volume and the second location, said intermediate memory locations temporarily storing the data packets in the first transfer operation.

16. A computer program product for use in a computer system having a data storage device having a plurality of data storage volumes, each data storage volume having a plurality of data subunits of memory locations assigned to a particular volume, and a storage control unit configured to control read operations from and write operations to the data storage device, wherein the computer program product comprises a computer readable storage medium having program instructions embodied therewith, the program instructions executable by a processor of the computer system to cause processor operations, the processor operations comprising:
data cleaning a first data subunit of memory locations of a first volume of a plurality of volumes of the data storage device to erase residual data stored in the first data subunit of memory locations, each particular volume of the plurality of volumes having a plurality of data subunits of memory locations assigned to the particular volume and a secure data overwrite target metadata attribute of a plurality of secure data overwrite target metadata attributes, identifying the particular volume and associated with the particular volume by volume identification and indicating when set, that all the data subunits of memory locations assigned to the particular identified volume have been targeted for a multi-pass secure data overwriting of the data subunits of memory locations at a first level of data security prior to being released, said data cleaning including:
determining whether the associated secure data overwrite target metadata attribute of the first volume of the data storage device has been set; and
in response to a determination that the associated secure data overwrite target metadata attribute of the first volume of the data storage device has been set, setting a data subunit status data structure for each data subunit of the first volume to indicate a status of each particular data subunit of memory locations of the first volume as pending a multi-pass secure data overwriting of the data subunit of memory locations;
determining as a function of a first data subunit status data structure for the first data subunit of memory locations, a status of the first data subunit of memory locations as pending a multi-pass secure data overwriting of the first data subunit of memory locations, and in response to the first data subunit status determination, performing a multi-pass secure data overwriting of the first data subunit of memory locations at the first level of data security; and in response to a determination that the associated secure data overwrite target metadata attribute of the first volume of the data storage device has not been set, performing an erasure of the first data subunit of memory locations at a second level of data security less secure than the first level of data security.

17. The computer program product of claim 16 wherein each data subunit is an extent of a volume so that the first data subunit is a first extent of memory locations and so that the data cleaning further includes in response to a determination that the associated secure data overwrite target metadata attribute of the first volume of the data storage device has been set, setting an extent status data structure indicating a status of the first extent of memory locations of the first volume to indicate the status of the first extent of memory locations as pending a multi-pass secure data overwriting of the first extent of memory locations.

18. The computer program product of claim 17 wherein the data cleaning further includes determining the status of the first extent of memory locations as pending a multi-pass secure data overwriting of the first memory location, and in response to the extent status determination, performing a multi-pass secure data overwriting of the first extent of memory locations.

19. The computer program product of claim 16 wherein the processor operations further comprise:

in a first transfer operation, transferring data packets between the first volume and a second location, said transferring including:

determining whether an end-to-end secure data overwrite metadata attribute of the first volume of the data storage device has been set; and in response to a determination that the end-to-end secure data overwrite metadata attribute of the first volume of the data storage device has been set, marking the data packets with a secure data overwrite packet flag to indicate a multi-pass secure data overwriting at intermediate memory locations between the first volume and the second location, said intermediate memory locations temporarily storing the data packets in the first transfer operation.

20. The computer program product of claim 16 wherein the processor operations further comprise: in a first transfer operation, transferring data packets between the first volume and a second location, said transferring including:

determining whether an end-to-end secure data overwrite metadata attribute of the first volume of the data storage device has been set; and in response to a determination that the end-to-end secure data overwrite metadata attribute of the first volume of the data storage device has been set, setting a secure data transfer flag for the first transfer operation to indicate a multi-pass secure data overwriting at intermediate memory locations between the first volume and the second location, said intermediate memory locations temporarily storing the data packets in the first transfer operation.

21. The computer program product of claim 19 wherein the transferring data packets further includes:

identifying intermediate memory locations between the first volume and the second location, which temporarily stored marked data packets in the first transfer operation; and multi-pass secure data overwriting identified intermediate memory locations between the first volume and the second location, which temporarily stored marked data packets in the first transfer operation.

22. The computer program product of claim 20 wherein the transferring data packets further includes:

in response to a determination that a data transfer flag for the first transfer operation has been set, marking the data packets with a secure data overwrite packet flag to indicate a multi-pass secure data overwriting at intermediate memory locations between the first volume and the second location, said intermediate memory locations temporarily storing the data packets in the first transfer operation;

identifying intermediate memory locations between the first volume and the second location, which temporarily stored data packets marked with the secure data overwrite packet flag in the first transfer operation; and multi-pass secure data overwriting identified intermediate memory locations between the first volume and the second location, which temporarily stored data packets marked with the secure data overwrite packet flag in the first transfer operation.

* * * * *